United States Patent
Nagasaki

[15] 3,695,401
[45] Oct. 3, 1972

[54] REVERSE AND REDUCTION GEAR FOR SHIPS

[72] Inventor: Michisuke Nagasaki, Toyonaka, Japan

[73] Assignee: Yanmar Diesel Engine Co., Ltd., Osaka, Japan

[22] Filed: Nov. 16, 1970

[21] Appl. No.: 89,555

[30] Foreign Application Priority Data

July 22, 1968 Japan ..................43/62580

[52] U.S. Cl. ..................192/21, 74/361, 74/377
[51] Int. Cl. ..................F16d 21/04, F16h 3/14
[58] Field of Search ..........192/21, 51; 74/361, 377

[56] References Cited

UNITED STATES PATENTS 2,220,542   11/1940   Peterson..................192/21 X
2,536,549   1/1951    Hindmarch..............74/361 X
2,762,230   9/1956    Meyer......................74/361 X Primary Examiner—Allan D. Herrmann
Attorney—Stevens, Davis, Miller & Mosher

[57] ABSTRACT

A reverse and reduction gear for ships wherein three clutch units are arranged arcuately around a large gear mounted on a thrust shaft, each clutch unit comprising an auxiliary shaft, loosely carrying driving and driven gears, and a clutch interposed between the two gears, and the driving gear of the center clutch unit is coupled to the input shaft and meshed with the driving gears of the clutch units on both sides, said driven gears of the three clutch units being meshed with the common large gear on the thrust shaft.

2 Claims, 3 Drawing Figures

M. NAGASAKI
INVENTOR

REVERSE AND REDUCTION GEAR FOR SHIPS

This invention relates to a reverse and reduction gear for ships.

In conventional reverse and reduction gears equipped with an ahead-astern clutching system for ships, power is transmitted by means of a shaft disposed in the center of the clutching system. Since it is required to have enough strength to bear the heavy load of power transmission, the center shaft must have a fairly large diameter. Consequently this has called for a large clutching system and therefore a bulky reverse and reduction gear to disadvantage.

By contrast, the reverse and reduction gear for ships according to this invention is so constructed that three clutch units are arranged in an arcuate formation around a large gear mounted on a thrust shaft, each clutch unit including an auxiliary shaft parallel to the thrust shaft, a driving gear and a driven gear both loosely mounted on the auxiliary shaft, and a clutch interposed between the two gears, and the driving gear of the center clutch unit is coupled to the input shaft and, at the same time, meshed with the driving gears of the clutch units adjacent to both sides of the center unit, said driven gears of the three clutch units being meshed with the common large gear on the thrust shaft.

The construction above described relieves the auxiliary shafts of the clutches of any task of power transmission. The shafts are merely required to support the driving and driven gears and, for that reason, they can be greatly reduced in diameter as compared with those in conventional devices of the character described. Accordingly, the individual clutch units and hence the reverse and reduction gear thus assembled as a whole can be compact, small and lightweight. In this sense the gear of the invention eliminates the foregoing disadvantage of the conventional arrangements.

Further, in the ordinary reverse and reduction gears for ships heretofore employed, the thrust shaft of the gear has been either centered to or offset with respect to the crankshaft of the engine. When offset, the thrust shaft has usually had its center of axis below that of the crankshaft.

According to this invention, the clutch units can be arranged at desirable points around the large gear on the thrust shaft. This means that the clutch units can be disposed below the thrust shaft and the center of axis of the thrust shaft comes above that of the input shaft coupled to the center clutch unit, that is, the crankshaft of the engine. Such an arrangement offers extreme convenience for the installation of an engine, for example, of a ferry boat or the like.

Now an embodiment of the present invention will be described hereunder with reference to the accompanying drawings, in which.

Figure 1:
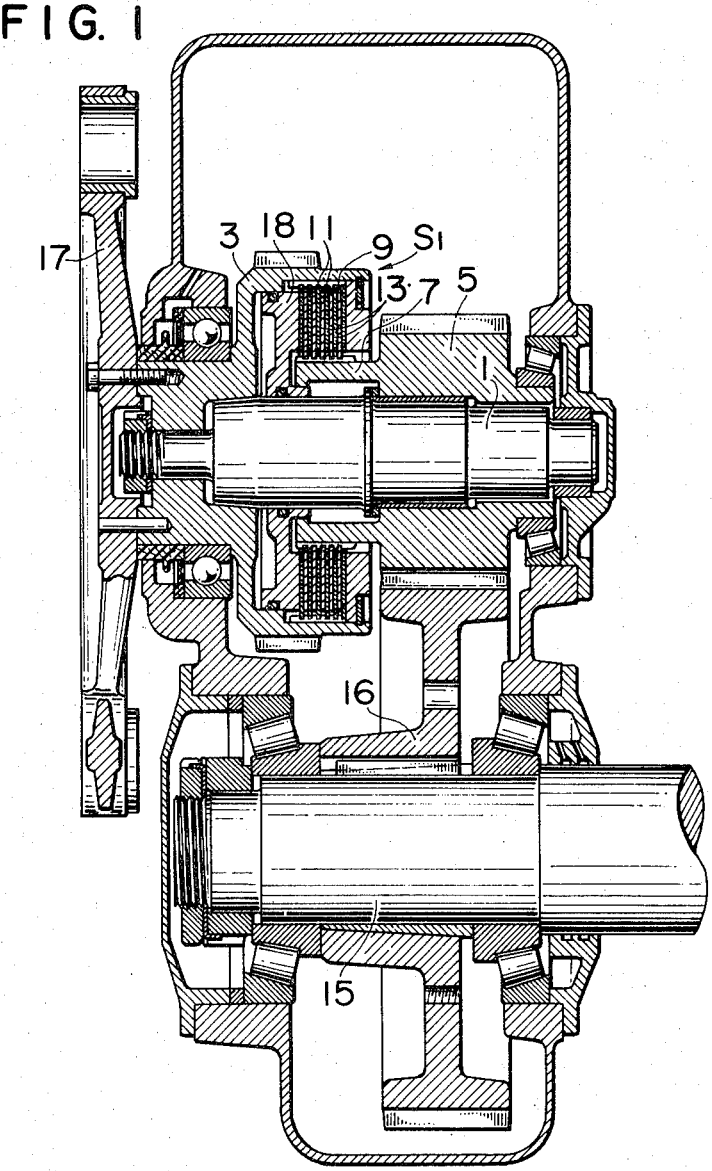
FIG. 1 is a vertically sectional side view of the embodiment.
Figure 2:
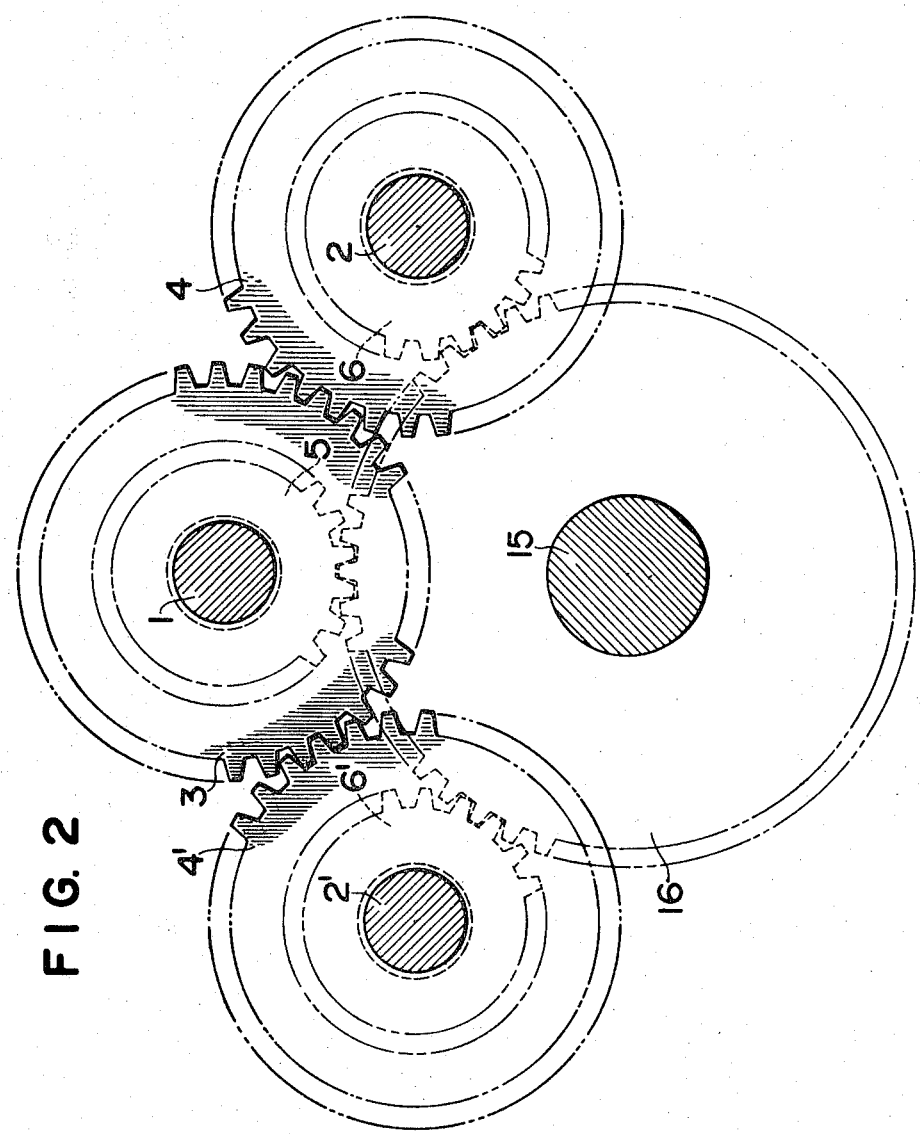
FIG. 2 is a diagrammatic front view, in transverse section, of the gearing of the embodiment.
Figure 3:
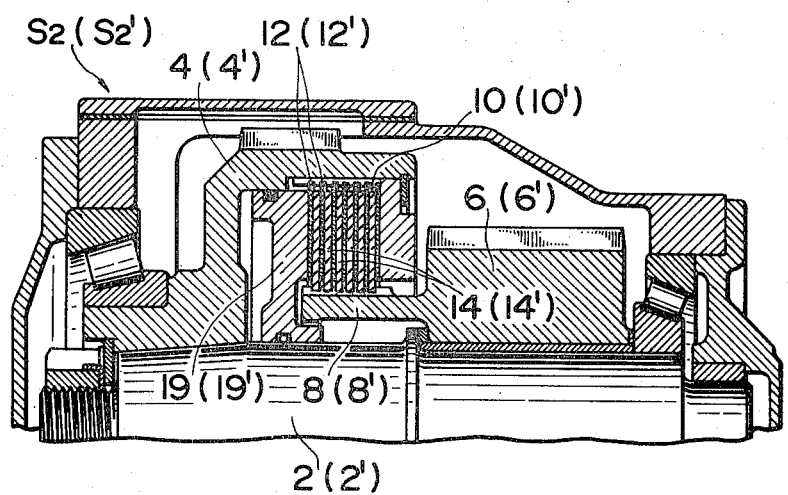
FIG. 3 is a vertically sectional side view of the ahead clutch unit of the embodiment.

Throughout these figures there are shown three clutch units S1, S2, S2' consisting of driving gears 3, 4, 4' and driven gears 5, 6, 6' both loosely mounted, respectively, on auxiliary shafts 1, 2, 2', said driven gears 5, 6, 6' having tubular shaft-like extensions 7, 8, 8' protruding from the hubs thereof and which are fitted in hollows 9, 10, 10' formed in the driving gears 3, 4, 4', and multiple disc clutches having pluralities of driving friction plates 11, 12, 12' which are secured to the inner surfaces of the driving gears 3, 4, 4' and pluralities of driven friction plates 13, 14, 14' which are secured to the other surfaces of the tubular shaft-like extensions 7, 8, 8', said multiple disc clutches being interposed, respectively, between the driving gears 3, 4, 4' and the tubular extensions 7, 8, 8'. These three clutch units S1, S2, S2' are disposed in an arcuate arrangement around a large gear 16 secured to a thrust shaft 15. The driving gear 3 of the center clutch unit, or astern clutch unit S1, is in mesh with the driving gears, 4, 4' of the other clutch units, or ahead clutch units S2, S2', located on both sides of said astern clutch unit. At the same time, the driven gears 5, 6, 6' of the three clutch units S1, S2, S2' are meshed with the large gear 16. The driving gear 3 of the astern clutch unit S1 is interlocked, through a flexible coupling 17, to the output shaft of the engine, or crankshaft or the like (not shown) which constitutes the input shaft for the gear of the present invention. Numerals 18, 19, 19' denote pistons which are suitably driven by hydraulic means to operate the clutches of the clutch units S1, S2, S2'.

Power transmission through the gearing of the present invention is accomplished in the following way. The power from the engine is transmitted from the input shaft to the driving gear 3 of the astern clutch unit S1, thus keeping said driving gear running. The rotation of the driving gear 3 is followed by constant rotation of the other driving gears 4, 4' of the both ahead clutch units S2, S2'.

If it is assumed that the astern clutch unit S1 is shifted from the neutral position to the driving position, the turning effort from the driving gear 3 will be transmitted through the pluralities of friction plates 11, 13 to the tubular shaft-like extension 7, which in turn will cause the driven gear 5 to drive the large gear 16, with the result that the thrust shaft 15 will run in the reverse direction.

Conversely if the astern clutch unit S1 is kept in the neutral position and the pair of similarly-shaped ahead clutch units S2, S2' are shifted from the neutral position to the driving position, the turning efforts from the driving gears 4, 4' will be transmitted via the pluralities of friction plates 12, 12', 14, 14' to the tubular shaft-like extensions 8, 8', so that the driven gears 6, 6' drive the large gear 16 and the thrust shaft 15 runs in the advancing direction.

Briefly stated, the present invention makes it possible with the construction described above to build a reverse and reduction gear which is, as a whole, smaller in size and lighter in weight than the conventional gears for the same purpose. Among other advantages of the present invention is that it permits the thrust shaft to be located above the center of axis of the input shaft, thus greatly facilitating the installation of an engine on a ship such as a ferry boat.

What is claimed is:

1. A reverse and reduction gear for ships comprising an input shaft, a thrust shaft, a large gear securely mounted on the thrust shaft, and three clutch units arranged in an arcuate formation around the large gear, characterized in that each of the clutch units includes an auxiliary shaft parallel to the thrust shaft, a driving gear and a driven gear both loosely mounted on the auxiliary shaft, and a clutch disposed between said two gears, and the driving gear of the center clutch unit is coupled to said input shaft and is, at the same time, in mesh with the driving gears of the clutch units adjacent to both sides of the center unit, and the driven gears of the three clutch units are meshed with the common large gear of the thrust shaft.

2. A reverse and reduction gear for ships according to claim 1 characterized in that the center clutch unit serves as an astern clutch unit and the adjoining clutch units on both sides of the center unit serve as ahead clutch units.

* * * * *

UNITED STATES PATENT OFFICE
CERTIFICATE OF CORRECTION

Patent No. 3,695,401            Dated October 3, 1972

Inventor(s) Michisuke NAGASAKI

It is certified that error appears in the above-identified patent and that said Letters Patent are hereby corrected as shown below:

This is a non-convention application; therefore, the Claim for Convention Priority and the reference to the Japanese application no. 43/62580 filed July 22, 1968 should be omitted.

Signed and sealed this 13th day of March 1973.

(SEAL)
Attest:

EDWARD M. FLETCHER, JR.
Attesting Officer

ROBERT GOTTSCHALK
Commissioner of Patents